United States Patent [19]
Seiner et al.

[11] Patent Number: 5,924,632
[45] Date of Patent: Jul. 20, 1999

[54] JET NOZZLE HAVING CENTERBODY FOR ENHANCED EXIT AREA MIXING

[75] Inventors: John M. Seiner, Williamsburg; Mikhail M. Gilinsky, Yorktown, both of Va.

[73] Assignee: The United States of America as represented by the Administrator of the National Aeronautics and Space Administration, Washington, D.C.

[21] Appl. No.: 08/850,572

[22] Filed: May 2, 1997

Related U.S. Application Data

[60] Provisional application No. 60/016,741, May 2, 1996.

[51] Int. Cl.$^6$ ....................................................... B64C 1/38
[52] U.S. Cl. ..................................... 239/265.19; 60/226.1
[58] Field of Search ................................. 60/262, 226.1; 239/265.19

[56] References Cited

U.S. PATENT DOCUMENTS

| | | | |
|---|---|---|---|
| 2,583,570 | 1/1952 | Hickman | 239/265.19 X |
| 3,443,757 | 5/1969 | Townend | 239/265.19 X |
| 3,673,803 | 7/1972 | Macdonald | 60/226.1 |
| 4,284,170 | 8/1981 | Larson et al. | 239/265.19 |
| 4,537,026 | 8/1985 | Nightinggale | 239/265.19 X |
| 4,786,016 | 11/1988 | Presz et al. | 239/265.19 X |
| 5,078,336 | 1/1992 | Carter | 239/265.19 X |

OTHER PUBLICATIONS

Seiner, John M., et al., "Supersonic Jet Noise and the High Speed Civile Transport", AIAA–89–2358, Jul. 10–12, 1989, 24 pgs.
Presz, Walter M., Jr., "Mixer/Ejector Noise Suppressors", AIAA–91–2243, Jun. 24–26, 1991, 11 pgs.
Ahuja, K. K., "Mixing Enhancement and Jet Noise Reduction Through Tabs Plus Ejectors", AIAA–93–4347, Oct. 25–27, 1993, 15 pgs.
Krothapalli, A. et al, "The Role of Streamwise Vortices on Sound Generation of a Supersonic Jet", AIAA 93–4320; Oct. 25–27, 1993; 11 pgs.
Seiner, John M. et al., "Nozzle Thrust Optimizationn While Reducing Jet Noise", CEAS/AIAA–95–149; 12–15 Jun., 1995; 22 pgs.
Seiner, J. et al., "Nozzle Thrust Optimzation While Reducing Jet Noise", AIAA 95–2191; Jun. 19–22, 1995; 27pgs.
Gilinsky, M. et al., "Corrugated Nozzles for Acoustic and Thrust Benefits"; AIAA/CEAS 96–1670; May 6–8, 1996; 31 pgs.

*Primary Examiner*—Kevin Weldon
*Attorney, Agent, or Firm*—Robin W. Edwards

[57] ABSTRACT

A nozzle arrangement includes a nozzle and a centerbody. The longitudinal axis of the centerbody is coaxially aligned with the nozzle. The centerbody has a free end portion shaped to create vortices in exhaust exiting the exit area. The vortices enhance mixing action in the exhaust and reduce exhaust noise while augmenting thrust.

16 Claims, 5 Drawing Sheets

JET NOZZLE HAVING CENTERBODY FOR ENHANCED EXIT AREA MIXING

This application claims the benefit of U.S. Provisional Application Ser. No. 60/016,741, filed May 2, 1996.

CROSS-REFERENCE TO RELATED PATENT APPLICATIONS

This patent application is related to commonly owned, co-pending patent application Ser. No. 08/848,851, filed May 2, 1997, entitled UNDULATED NOZZLE FOR ENHANCED EXIT AREA MIXING by the same inventors as this patent application.

ORIGIN OF THE INVENTION

The invention described herein was jointly made by an employee of the United States Government and a National Research Council Research Associate and may be manufactured and used by or for the Government for governmental purposes without the payment of any royalties thereon or therefor.

BACKGROUND OF THE INVENTION

1. Field of the Invention

This invention relates to jet nozzles. More specifically, the invention is a jet nozzle arrangement that incorporates a coaxial centerbody having a shape that enhances the mixing of exhaust exiting the nozzle exit area.

2. Description of the Related Art

In the field of jet nozzle design, researchers are always looking for ways to reduce jet noise while optimizing thrust performance. One current jet nozzle design has a nozzle with a conically-tipped centerbody coaxially aligned within the nozzle. For example, FIG. 1 depicts a cutaway perspective view of a two-contour, separate flow, co-annular nozzle arrangement that is referenced generally by numeral 100. Nozzle arrangement 100 includes an external nozzle portion 102, an internal nozzle portion 104 and a centerbody 106 having a conical tip 108 coaxial within internal nozzle portion 104. Nozzle arrangement 100 can be used in subsonic or supersonic applications.

In the subsonic regime, conical tip 108 of centerbody 106 resides within internal nozzle portion 104 as shown. For the production of additional thrust required for the supersonic regime, centerbody 106 is moved (by an actuator that is not shown) axially so that conical tip 108 extends beyond the exit areas of external and internal nozzle portions 102 and 104, respectively. External nozzle portion 102 and internal nozzle portion 104 could also be moved axially to change the nozzle exit area and corresponding average jet exhaust Mach number. Reduction of noise is one of the ongoing studies associated with this and other centerbody-type nozzle arrangements.

SUMMARY OF THE INVENTION

Accordingly, it is an object of the present invention to provide a nozzle design that reduces noise.

Another object of the present invention is to provide noise reduction for jet nozzle arrangements that include a coaxially aligned centerbody.

Other objects and advantages of the present invention will become more obvious hereinafter in the specification and drawings.

In accordance with the present invention, a nozzle arrangement includes a nozzle having an exit area. A centerbody has its longitudinal axis coaxially aligned with the nozzle. The centerbody has a free end portion positionable in the vicinity of the exit area. The free end portion is shaped to create vortices in exhaust exiting the exit area thereby enhancing mixing action in the exhaust and reducing exhaust noise while augmenting thrust.

DETAILED DESCRIPTION OF THE INVENTION

Figure 2:
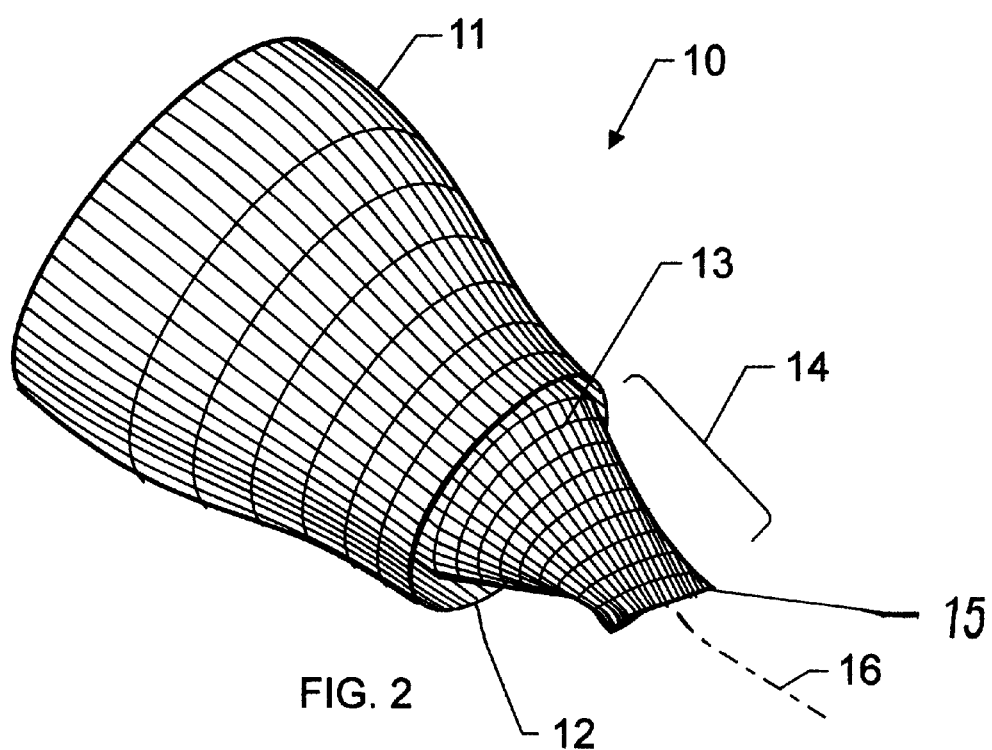
FIG. 2 is a perspective view of one embodiment of a nozzle arrangement according to the present invention in which the centerbody is shaped at its free end to introduce vortices in the nozzle's exhaust in order to enhance mixing action as a means of noise reduction.

Referring now to the drawings, and more particularly to FIG. 2, a nozzle arrangement according to the present invention is shown and referenced generally by numeral 10. For purpose of illustration, cage lines are used in FIG. 2 and throughout the figures to provide a three-dimensional perspective. Nozzle arrangement 10 includes a nozzle 11 defining an exit area 12 at one end thereof. Nozzle 11 is representative of any conventional nozzle, e.g., single-contour, two-contour, convergent, divergent, co-annular, etc., and does not represent a limitation of the present invention. Coaxially aligned within nozzle 11 is a centerbody 13 shown with a tapered portion thereof (designated by numeral 14) extending beyond exit area 12 to a free end 15. Note that while this positioning may be used for the supersonic regime, such positioning is not a limitation of the present invention. Rather, this particular positioning of centerbody 13 is selected for ease of illustration in this and all of the remaining embodiments shown and described herein. As would be understood by one of ordinary skill in the art, tapered portion 14 is generally positionable entirely inside, partially inside, or entirely outside of nozzle 11. The same holds true in the present invention for purposes of enhancing mixing of exhaust exiting area 12. Thus, it is sufficient for tapered portion 14 and free end 15 (or any other "tapered portion" and "free end" described herein) to be in the vicinity of exit area 12 so that tapered portion 14 and free end 15 affect the exhaust in a way to be described further below.

Centerbody 13 is typically defined by a continuous cross-section (e.g., round, square, etc.) leading up to tapered portion 14. However, tapered portion 14 is reduced or tapered in cross-section along the centerbody's longitudinal axis 16 leading to free end 15. More specifically, in FIG. 2, tapered portion 14 tapers down to a planar edge (resembling the edge of a flat-head screwdriver) at free end 15 that is transverse to longitudinal axis 16.

Figure 3A:
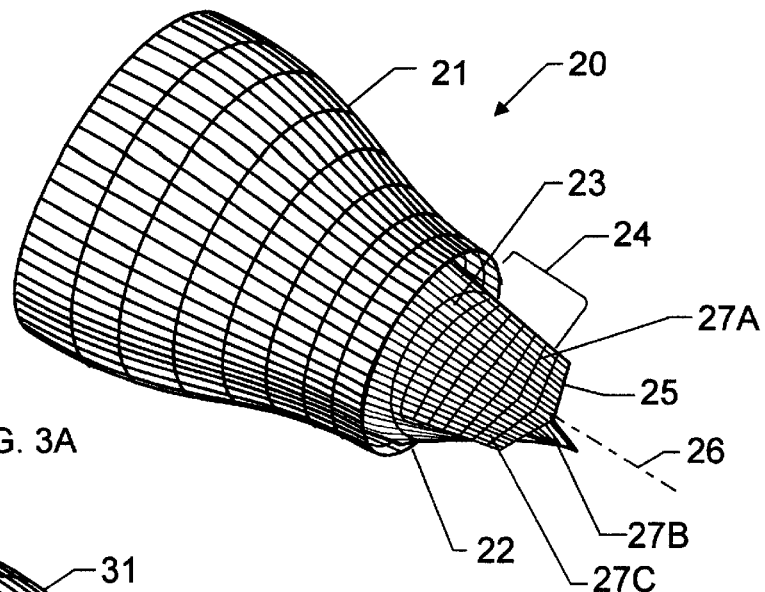
FIG. 3A is a perspective view of another embodiment in which the centerbody is shaped at its free end to define three intersecting planes.
Figure 3B:
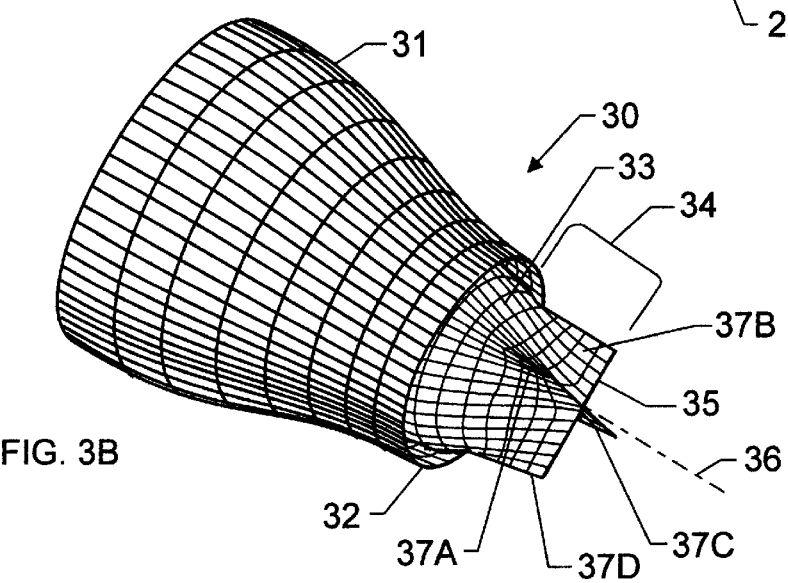
FIG. 3B is a perspective view of another embodiment in which the centerbody is shaped at its free end to define four intersecting planes.
Figure 3C:
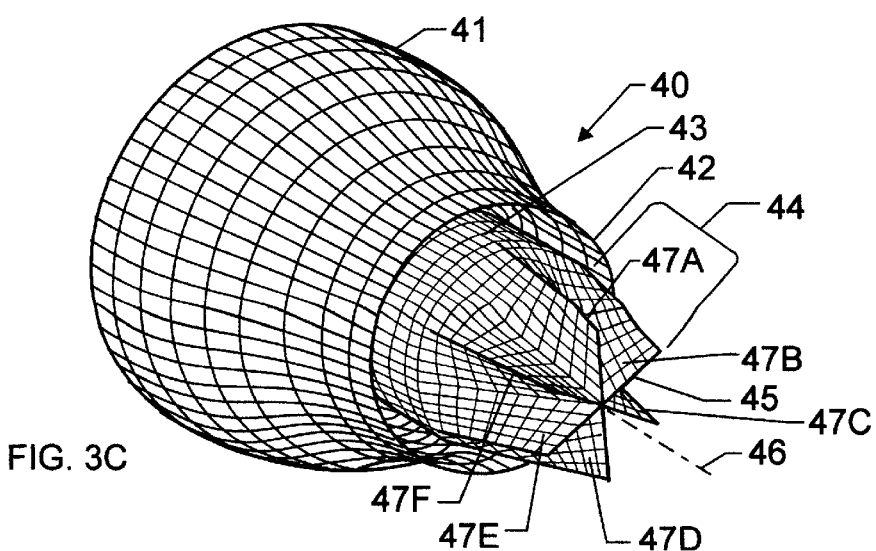
FIG. 3C is a perspective view of another embodiment in which the centerbody is shaped at its free end to define six intersecting planes.

Three alternative embodiments are shown in FIGS. 3A, 3B and 3C, where the nozzle arrangements are referenced generally by the numerals 20, 30 and 40, respectively. In FIG. 3A, nozzle 21 and exit area 22 are analogous to nozzle 11 and exit area 12. Tapered portion 24 of centerbody 23 is reduced or tapered in cross-section along longitudinal axis 26 leading to free end 25. More specifically, in FIG. 3A, tapered portion 24 tapers to define three planes 27A, 27B and 27C that extend parallel to, and intersect at, longitudinal axis 26. In FIG. 3B, tapered portion 34 tapers to define four such planes 37A–37D that intersect at longitudinal axis 36. In FIG. 3C, tapered portion 44 tapers to define six planes 47A–47F. In general, the tapered portion of the centerbody can be tapered to define any number of such planes that intersect at the centerbody's longitudinal axis.

Figure 4A:
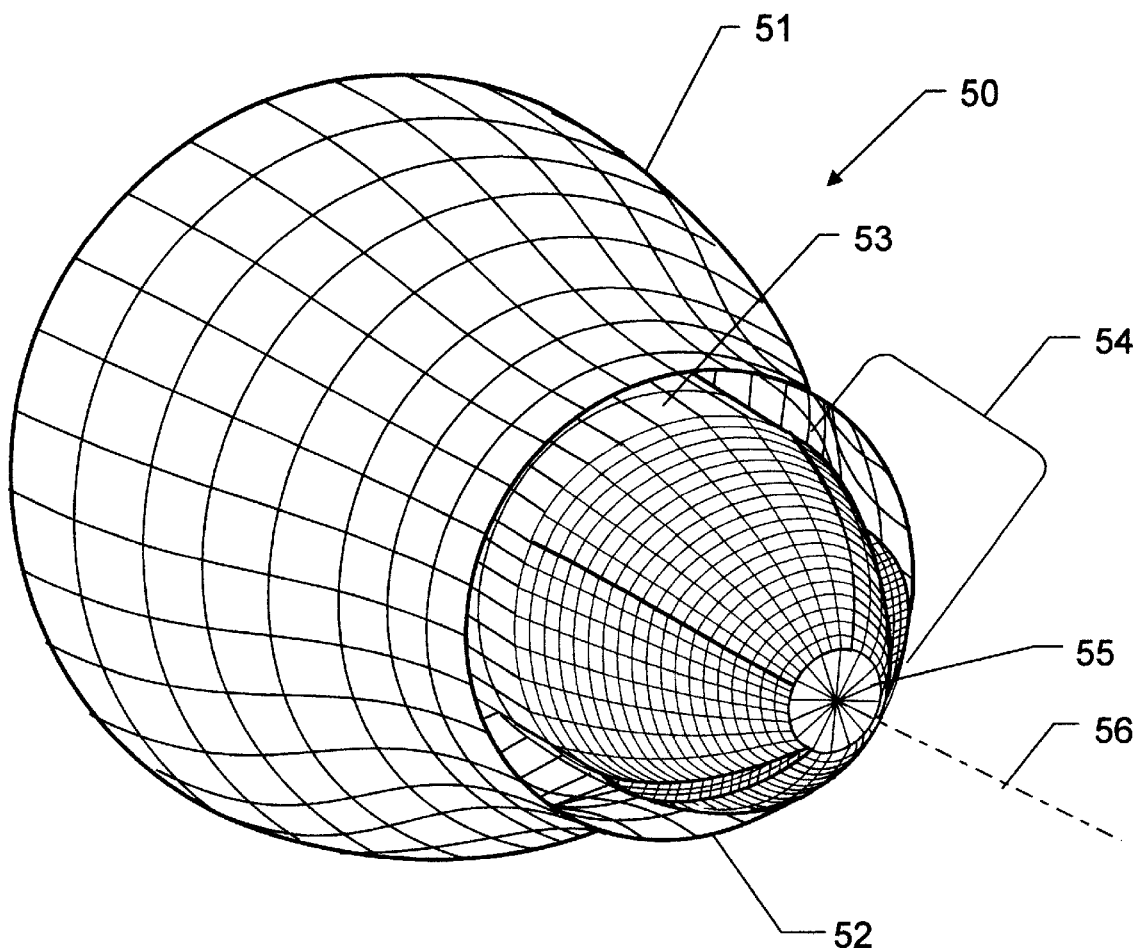
FIG. 4A is a perspective view of another embodiment in which the centerbody is tapered leading to its free end where the tapered portion defines an undulating surface about the periphery thereof.
Figure 4B:
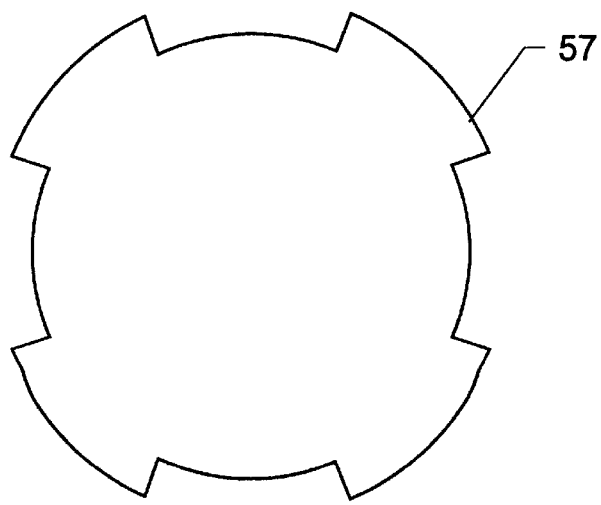
FIG. 4B is a cross-section of the tapered portion depicting one type of undulations.

The tapered portion of the centerbody can also be shaped as in nozzle arrangement 50 shown in FIG. 4A. Once again, only the prefix (i.e., "5") is changed for elements of the arrangement that are analogous to previously described embodiments. Tapered portion 54 is generally conically tapered with the periphery thereof forming an undulating surface. This is more clearly seen in FIG. 4B which represents a cross-section of tapered portion 54 taken in a plane perpendicular to longitudinal axis 56 and depicting an undulating surface periphery 57. In FIGS. 4A and 4B, undulating surface periphery 57 is defined by a periodic function resembling a square wave. However, the present invention is not so limited. For example, the undulations could be sinusoidal in nature. Further, the number of undulations is not a limitation of the present invention, but will instead be determined for a particular application/performance.

Figure 5:
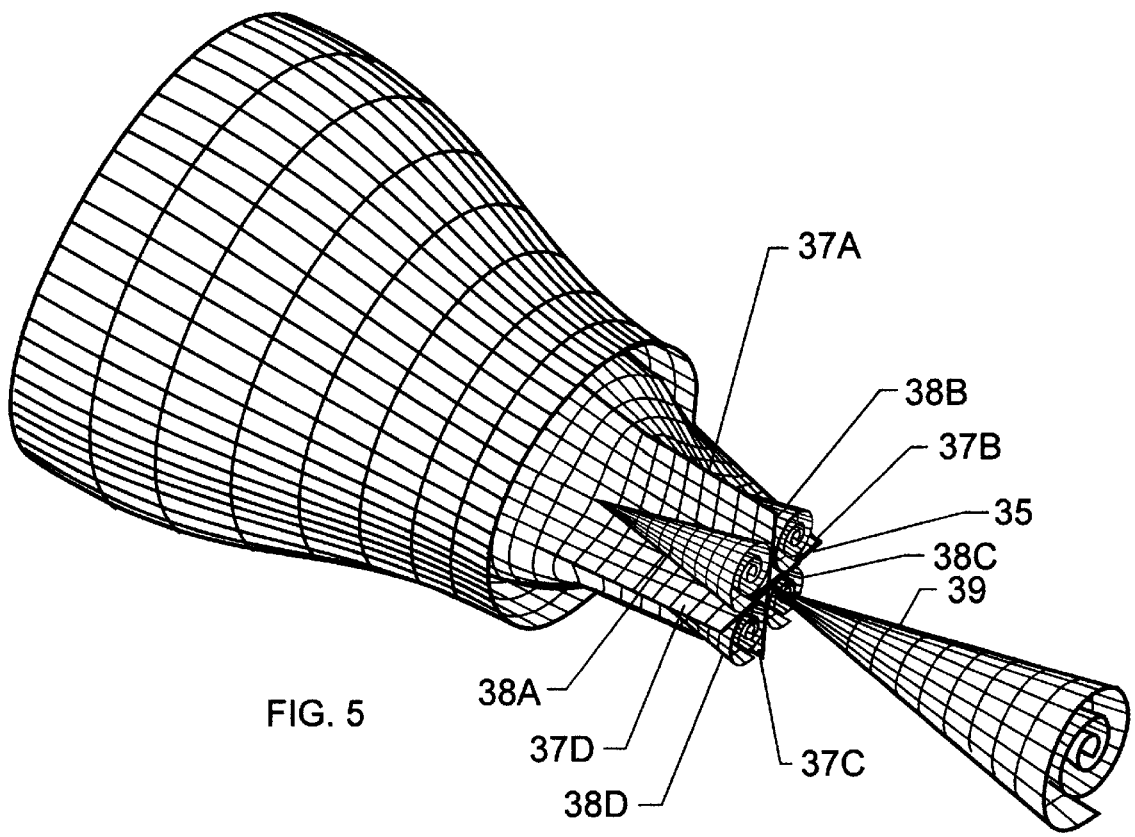
FIG. 5 is a perspective view of the embodiment depicted in FIG. 3B for schematically illustrating the location of vortices created upstream and downstream of the centerbody's free end.

Each of the above-described embodiments enhances the mixing of the exhaust in the ambient air at the nozzle exit area as a means of reducing noise. In general, the shape of the centerbody's tapered portion/free end is such that vortices are created in the exhaust at and/or near the nozzle's exit. More specifically, counter-rotating or anti-symmetric vortices are created adjacent the tapered portion upstream of the centerbody's free end. These upstream vortices then meet at some angle at the free end to generate a larger vortex downstream of the free end. By way of illustration, this is depicted schematically in FIG. 5 for the FIG. 3B embodiment. In FIG. 5, the upstream vortices form between adjacent ones of planes 37A–37D, e.g., vortex 38A forms between planes 37A and 37D. The four anti-symmetric vortices 38A–38D meet at free end 35 and form the larger vortex 39 downstream of free end 35. As a result, mixing of the exhaust with ambient air at the exit area of the nozzle is enhanced and exhaust noise is reduced.

Figure 1:
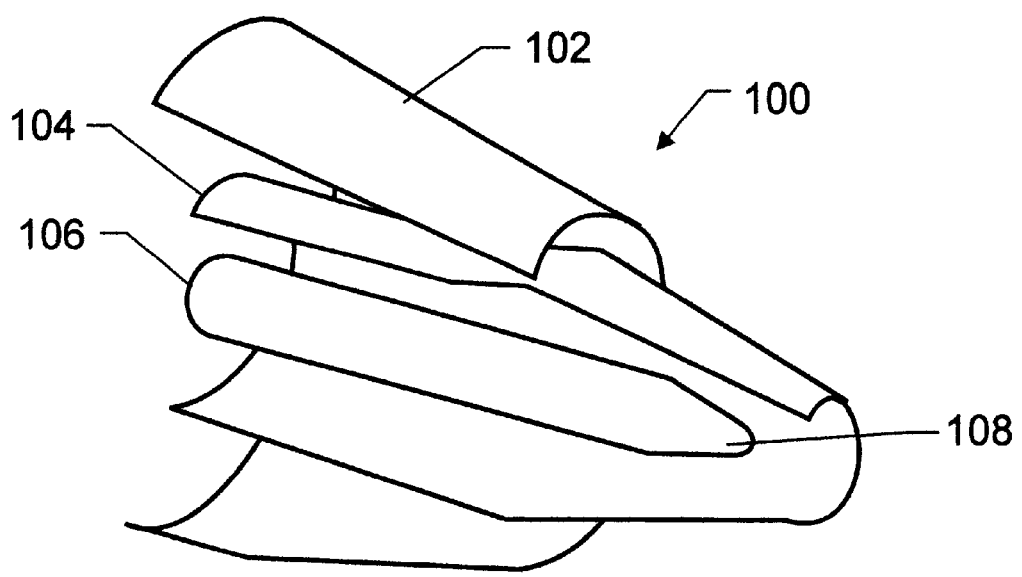
FIG. 1 is a cut-away perspective view of a prior art co-annular nozzle arrangement that includes a coaxially aligned centerbody.

Each of the tapered-portion shapes described above also improves flow stagnation at the local symmetry line defined the longitudinal axis of the centerbody. This increases pressure on the lateral surface of the centerbody. For the same reason, such a three-dimensional flow produces a thinner boundary layer than the usual axisymmetric flow. Therefore, the present invention will also augment thrust when compared with other prior art centerbody shapes such as a tapered cone (see FIG. 1).

The advantages of the present invention are numerous. The shape of the centerbody's tapered portion/free end introduces counter-rotating vortices therealong. As the flow moves to the centerbody's free end, neighboring vortices meet at some angle to mutually mix into one another. Further, flow impulse on the lateral area of the centerbody is affected to thereby increase the resulting nozzle thrust.

Although the invention has been described relative to specific embodiments thereof, there are numerous other variations and modifications that will be readily apparent to those skilled in the art in light of the above teachings. For example, the present invention can also be used in conjunction with a single or two-contour separate flow, co-annular nozzle arrangement such as that shown in FIG. 1. The present invention could also be used with single or co-annular nozzle arrangements having a nozzle exit defined by an undulating lip, or a nozzle throat having a cross-section that undulates around the periphery thereof, of a combination of these structural features. (The details and advantages of such undulating lips and cross-sections are disclosed in detail in applicants' above-identified cross-referenced patent application.)

Figure 6A:
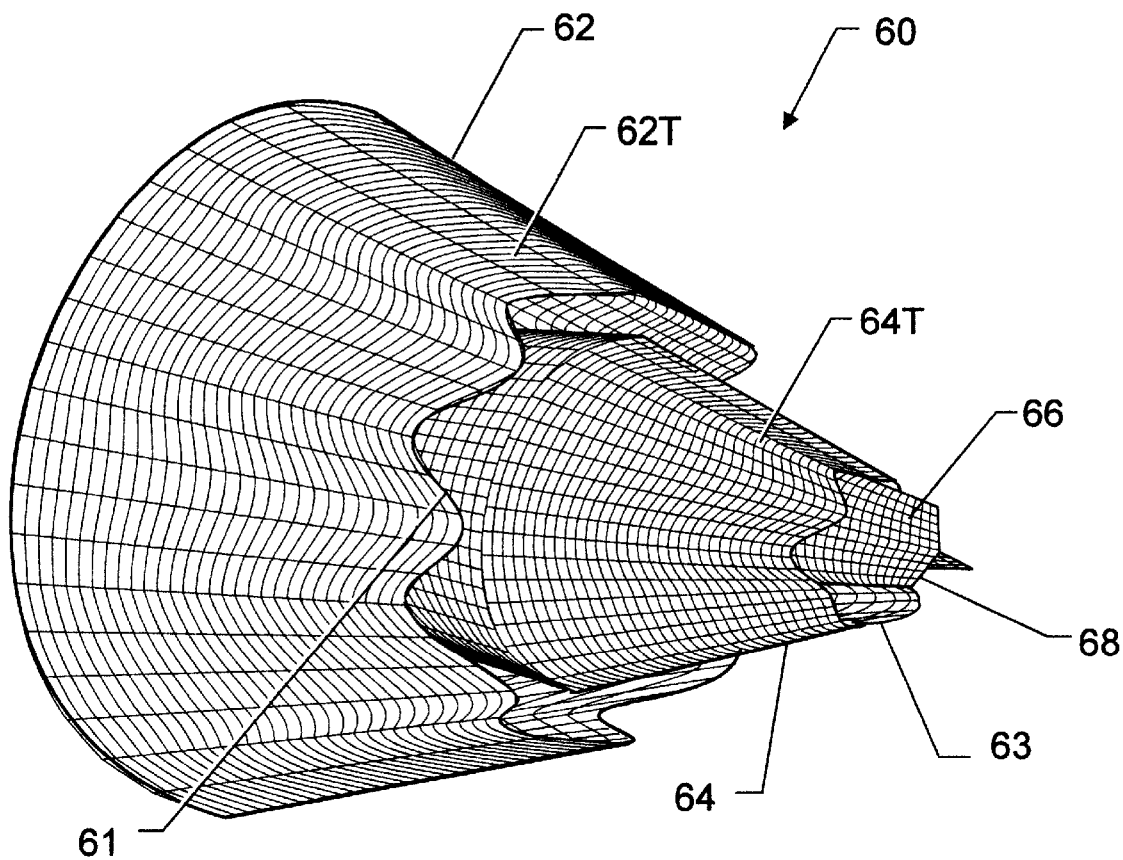
FIG. 6A is a perspective view of another alternative embodiment in which a co-annular nozzle arrangement has undulating lips, throat cross-sections that undulate, and a shaped centerbody in accordance with the present invention.

By way of example, the combination of an undulated lip and undulating cross-section of the nozzle throat is shown for a co-annular arrangement 60 in FIG. 6A. Co-annular nozzle arrangement 60 has external nozzle portion 62, internal nozzle portion 64 and centerbody 66. Centerbody 66 has tapered portion 68 similar to that depicted in the embodiment of FIG. 3A. However, it is to be understood that tapered portion 68 could be alternatively shaped in accordance with any other of the above-described embodiments.

As described in applicants' cross-referenced patent application, lip 61 of external nozzle portion 62 is undulating as is lip 63 of internal nozzle portion 64. The undulations can be defined by periodic functions such as a smoothly shaped sinusoid. The function and number of undulations for each nozzle portion need not be the same. In terms of contoured nozzles, i.e., converging, diverging, etc., the undulations at the nozzle's lip are defined by components that extend both perpendicular and parallel to the centerbody's longitudinal axis.

Figure 6B:
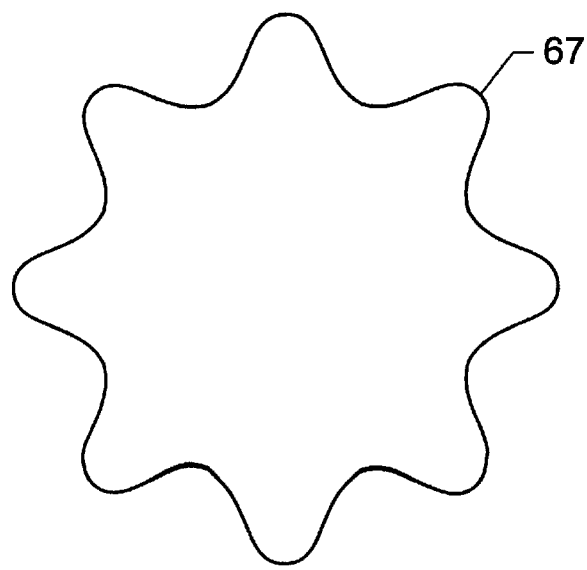
FIG. 6B is a cross-section of the throat of the external nozzle portion of the embodiment in FIG. 6A depicting the undulating periphery thereof.

In addition, as evidenced by this example, throat 62T of external nozzle portion 62 and throat 64T of internal nozzle portion 64 can simultaneously present undulations about the periphery thereof. This is shown for external nozzle portion 62 in FIG. 6B where a cross-section of throat 62T presents an undulating surface periphery 67. Thus, the cross-sectional undulations are essentially defined by a radial component that extends perpendicular to the centerbody's longitudinal axis.

It is therefore to be understood that, within the scope of the appended claims, the invention may be practiced other than as specifically described.

What is claimed as new and desired to be secured by letters patent of the united states is:

1. A nozzle arrangement, comprising:
   a nozzle having an exit area; and a centerbody having a longitudinal axis coaxially aligned with said nozzle, said centerbody including a portion thereof tapering in cross-section along said longitudinal axis to a free end, said tapered portion and said free end positionable in the vicinity of said exit area, said tapered portion tapering to define at least one planar edge at said free end, said at least one planar edge being transverse to said longitudinal axis, said tapered portion creating anti-symmetric vortices in exhaust exiting said exit area for enhancing mixing action in said exhaust, thereby reducing exhaust noise while augmenting thrust.

2. A nozzle arrangement as in claim 1 wherein said nozzle terminates with an undulating lip at said exit area.

3. A nozzle arrangement as in claim 2 wherein a tapered portion of said nozzle is defined by a cross-section that undulates about the periphery thereof.

4. A nozzle arrangement as in claim 1 wherein a tapered portion of said nozzle is defined by a cross-section that undulates about the periphery thereof.

5. A nozzle arrangement as in claim 1 further comprising an external nozzle co-annularly positioned about said nozzle, wherein a co-annular flow area is formed therebetween.

6. A nozzle arrangement as in claim 5 wherein each of said nozzle and said external nozzle terminate in an undulating lip.

7. A nozzle arrangement as in claim 6 wherein a tapered portion of each of said nozzle and said external nozzle is defined by a cross-section that undulates about the periphery thereof.

8. A nozzle arrangement as in claim 5 wherein a tapered portion of each of said nozzle and said external nozzle is defined by a cross-section that undulates about the periphery thereof.

9. A nozzle arrangement, comprising:

a nozzle having an exit area; and a centerbody having a longitudinal axis coaxially aligned with said nozzle, said centerbody including a portion thereof tapering in cross-section along said longitudinal axis to a free end, said tapered portion and said free end positionable in the vicinity of said exit area, wherein any cross-section of said tapered portion taken perpendicular to said longitudinal axis defines a periphery of undulations, said tapered portion creating anti-symmetric vortices in exhaust exiting said exit area for enhancing mixing action in said exhaust, thereby reducing exhaust noise while augmenting thrust.

10. A nozzle arrangement as in claim 9 wherein said nozzle terminates with an undulating lip at said exit area.

11. A nozzle arrangement as in claim 10 wherein a tapered portion of said nozzle is defined by a cross-section that undulates about the periphery thereof.

12. A nozzle arrangement as in claim 9 wherein a tapered portion of said nozzle is defined by a cross-section that undulates about the periphery thereof.

13. A nozzle arrangement as in claim 9 further comprising an external nozzle co-annularly positioned about said nozzle, wherein a co-annular flow area is formed therebetween.

14. A nozzle arrangement as in claim 13 wherein each of said nozzle and said external nozzle terminate in an undulating lip.

15. A nozzle arrangement as in claim 14 wherein a portion of each of said nozzle and said external nozzle is defined by a cross-section that undulates about the periphery thereof.

16. A nozzle arrangement as in claim 13 wherein a portion of each of said nozzle and said external nozzle is defined by a cross-section that undulates about the periphery thereof.

\* \* \* \* \*